United States Patent
Funato et al.

(10) Patent No.: US 7,251,253 B2
(45) Date of Patent: Jul. 31, 2007

(54) AUDIO PACKET COMMUNICATIONS SYSTEM, NETWORK TELEPHONE TERMINAL AND SPECIAL PACKET PROCESS METHOD

(75) Inventors: Yasuo Funato, Hachioji (JP); Takeshi Makita, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1056 days.

(21) Appl. No.: 10/242,721

(22) Filed: Sep. 13, 2002

(65) Prior Publication Data

US 2003/0053445 A1 Mar. 20, 2003

(30) Foreign Application Priority Data

Sep. 17, 2001 (JP) .............................. 2001-282374

(51) Int. Cl.
*H04J 3/16* (2006.01)
(52) U.S. Cl. .................... 370/466; 370/352; 379/88.24
(58) Field of Classification Search .................... None
See application file for complete search history.

(56) References Cited

U.S. PATENT DOCUMENTS 5,444,774 A * 8/1995 Friedes ................. 379/266.01
5,654,957 A * 8/1997 Koyama ..................... 370/355
6,958,980 B2 * 10/2005 Tarle et al. ................. 370/259
2001/0036197 A1 * 11/2001 Kakiuchi ..................... 370/466

FOREIGN PATENT DOCUMENTS

| EP | 0 829 995 A2 | 3/1998 |
|---|---|---|
| EP | 0 829 995 A3 | 3/1998 |
| EP | 0 987 846 A2 | 3/2000 |
| EP | 1 058 442 A2 | 12/2000 |
| EP | 1 244 282 A2 | 9/2002 |
| JP | 2000-059471 | 2/2000 |
| JP | 2000-295354 | 10/2000 |

* cited by examiner

*Primary Examiner*—Chi Pham
*Assistant Examiner*—Phuc Tran
(74) *Attorney, Agent, or Firm*—Finnegan, Henderson, Farabow, Garrett & Dunner, L.L.P.

(57) ABSTRACT

A host apparatus incorporates a holding-tone generator. The holding-tone generator generates a holding-tone packet. The holding-tone packet is broadcast, as a broadcast packet, to network telephone terminals. Each network telephone terminal receives the holding-tone packet if it assumes a holding state.

4 Claims, 3 Drawing Sheets

AUDIO PACKET COMMUNICATIONS SYSTEM, NETWORK TELEPHONE TERMINAL AND SPECIAL PACKET PROCESS METHOD

CROSS-REFERENCE TO RELATED APPLICATIONS

This application is based upon and claims the benefit of priority from the prior Japanese Patent Application No. 2001-282374, filed Sep. 17, 2001, the entire contents of which are incorporated herein by reference.

BACKGROUND OF THE INVENTION

1. Field of the Invention

The present invention relates to an audio packet communications system that comprises a LAN (Local Area Network), a plurality of telephone terminals connected to the LAN, and a telephone network such as the public network and a dedicated network. In the system, audio packets are transmitted between the network telephone terminals and between any network telephone terminal and the telephone network.

2. Description of the Related Art

Conventional private network systems comprise a PBX (Private Branch Exchange) or a host apparatus and audio communications terminals such as telephones. The audio communications terminals are connected to the PBX or the host apparatus and function as extension terminals. The PBX or the host apparatus connects any extension terminal to the external communications network such as the public network or a dedicate communications network. Therefore, the extension terminals can communicate with one another, and each extension terminal can communicate with any terminal provided on the public network or dedicated communications network, via the PBX or the host apparatus. Data terminals, such as personal computers, are connected to the LAN. The data terminals can therefore exchange E-mails and data with one another through the LAN. A communications system has been proposed, which comprises an audio communications system having a PBX or a host apparatus, a data communications system having a LAN, and a gateway that links the audio communication system and the data communications system.

A system has been proposed in recent years. This system comprises audio communications terminals (e.g., telephones), a LAN that connects these terminals, and a host apparatus that connects the LAN to an external communications network such as the public network or a dedicated network. In the system, the audio communications terminals can communicate with one another, and each audio communications terminal can communicate with any audio communication terminal provided on the external communications network. Each audio communications terminals and the host apparatus perform convert protocol and data format.

When any audio terminal performs a holding process in the system described above, the host apparatus issues a holding tone. The holding tone is transmitted, in the form of a packet, to not only the audio terminal but also the terminal with which the audio terminal is communicating.

In the system described above, two or more audio terminals may assume the holding state at the same time. If this happens, the LAN band needs to be broad in proportion to the number of audio terminals in the holding state. The communications traffic on the LAN inevitably increases. In some cases, the communication traffic may surpass the traffic capacity of the LAN. Such a heavy traffic may greatly delay the transmission of data and other calls in the LAN, or may result in a loss of some packets in the LAN.

To prevent these troubles in the LAN, a system has been proposed in Jpn. Pat. Appln. KOKAI Publication No. 2000-59471. In this system, the telephone terminals connected to a LAN have a holding-tone source each. The use of a holding-tone source for each telephone terminal not only renders the system large and massive, but also increases investment cost on the part of the users.

BRIEF SUMMARY OF THE INVENTION

An object of the present invention is to provide an audio packet communications system, a network telephone terminal and a special packet process method comprising a local area network and a plurality of telephone terminals connected to the network, which can account for demands made by the network telephone terminals for special audio packets such as holding-tone packets, without causing an increase in the network communications traffic, and which can yet be operated at low cost.

An audio packet communications system according to this invention comprises: a local area network having a plurality of nodes which shares a transfer medium and which performs communication independently of one another; a plurality of network telephone terminals connected to the local area network, each configured to convert an input audio signal, into an audio packet, transmit the audio packet to the local area network, convert an audio packet received from the local area network, convert the audio packet into an audio signal, and output the audio signal; an exchanger which connects the network telephone terminals to one another in a first state and the local area network to an external communications network in a second state, converts an audio signal received from the external communications network, into an audio packet, transmits the audio packet to the local area network, converts an audio packet received from the local area network, into an audio signal, and sends the audio signal to the external communications network; and special packet transmitting means for transmitting, to the local area network, a special audio packet which is to be simultaneously received at the nodes of the local area network for the network telephone terminals. Each of the network telephone terminals comprises a special packet receiving means for receiving the special audio packet when the special audio packet is demanded at the network telephone terminal.

DETAILED DESCRIPTION OF THE INVENTION

An embodiment of the present invention will be described in detail, with reference to the accompanying drawings.

Figure 1:
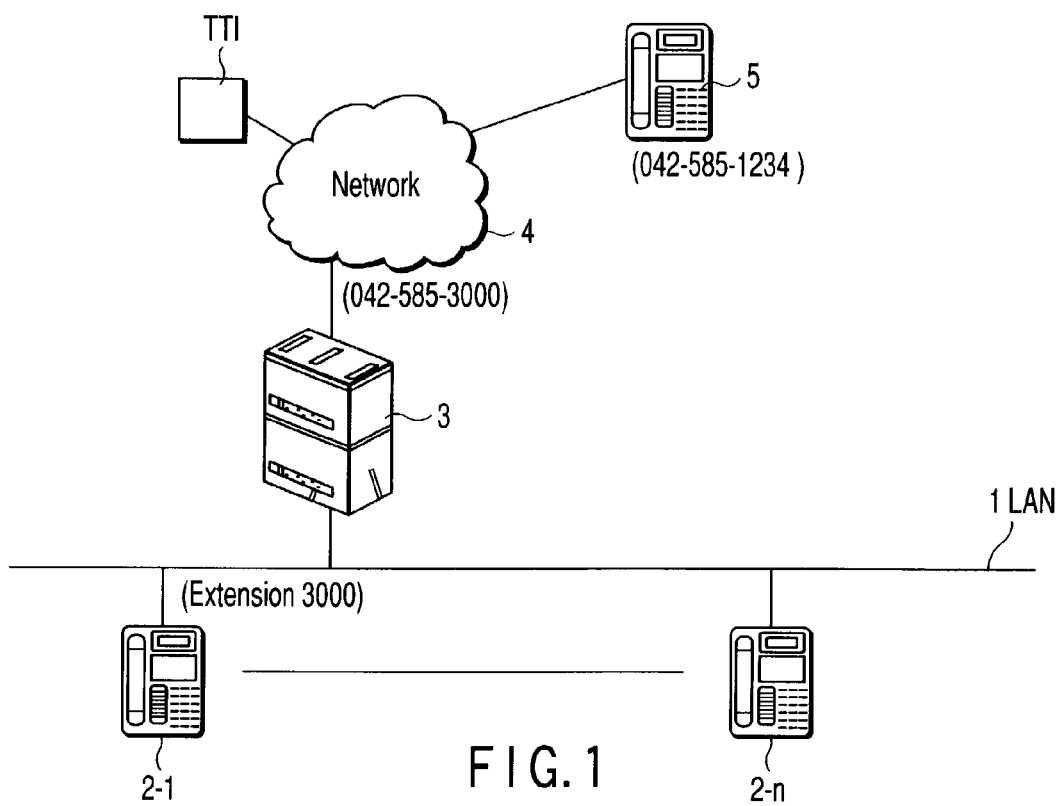
FIG. 1 is a schematic representation of an audio packet communications system according to an embodiment of the present invention.

FIG. 1 shows an audio packet communications system according to an embodiment of the invention.

The system has a LAN 1, a plurality of network telephone terminals 2-1 to 2-n, and a host apparatus 3. The terminals 2-1 to 2-n are connected the LAN 1. The host apparatus 3 connects the network telephone terminals 2-1 to 2-n on the LAN 1, to one another in an internal mode. The host apparatus 3 also connects the LAN 1 to a network 4 which may be the public network or a dedicated network in an external mode. The host apparatus 3 has the function of converting the communications protocol and signal format for the communication between the LAN 1 and the network 4.

To the network 4 there are connected an external telephone terminal 5 and a holding-tone provider TT1.

Figure 2:
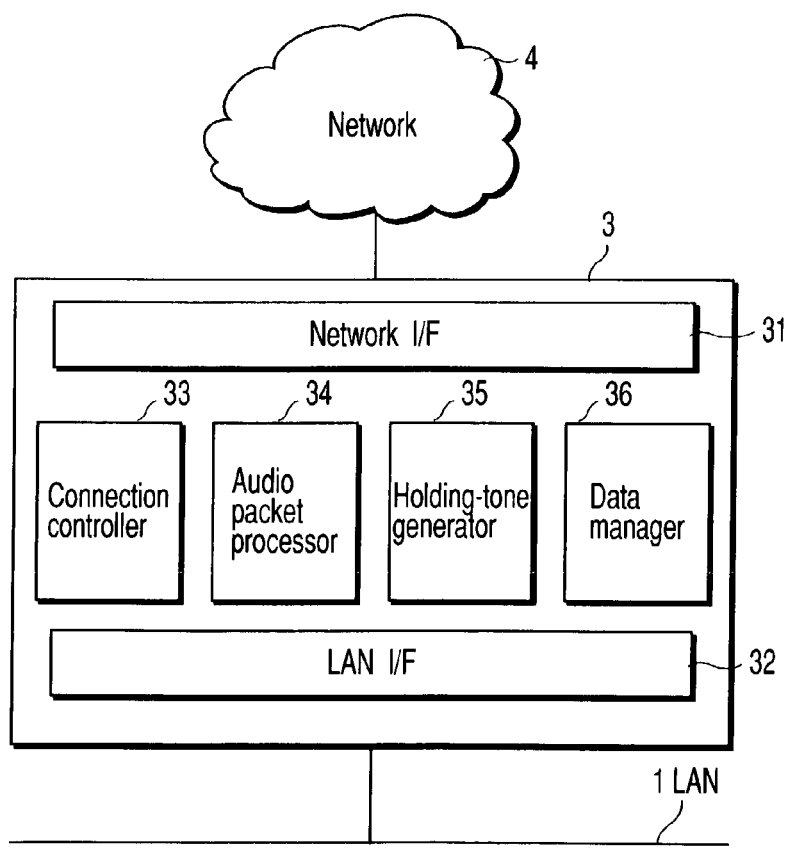
FIG. 2 is a block diagram of the host apparatus incorporated in the system shown in FIG. 1.

The host apparatus 3 performs various functions, which are depicted in FIG. 2 that is a block diagram.

More precisely, the host apparatus comprises a network interface (I/F) 31, a LAN interface (I/F) 32, a connection controller 33, an audio packet processor 34 (the processor 34), a holding-tone generator 35, and a data manager 36. The data manager 36 stores routing information and the like, which the connection controller 33 uses to accomplish connection control.

The connection controller 33 controls the connection between the LAN 1 and the network 4. The processor 34 converts audio signals received from the network 4, into audio packets that cab be easily transferred in the LAN 1. The audio packets are supplied from the processor 34 to the LAN 1. The processor 34 receives audio packets from the LAN 1 and converts them into audio signals that can be readily transferred in the network 4. The audio signals are supplied from the processor 34 to the network 4.

The holding-tone generator 35 generates a holding-tone packet representing a continuous tone or repeated tones. The holding-tone packet is transmitted, as a broadcast packet, to the network telephone terminals 2-1 to 2-n that are connected to the LAN 1.

Figure 3:
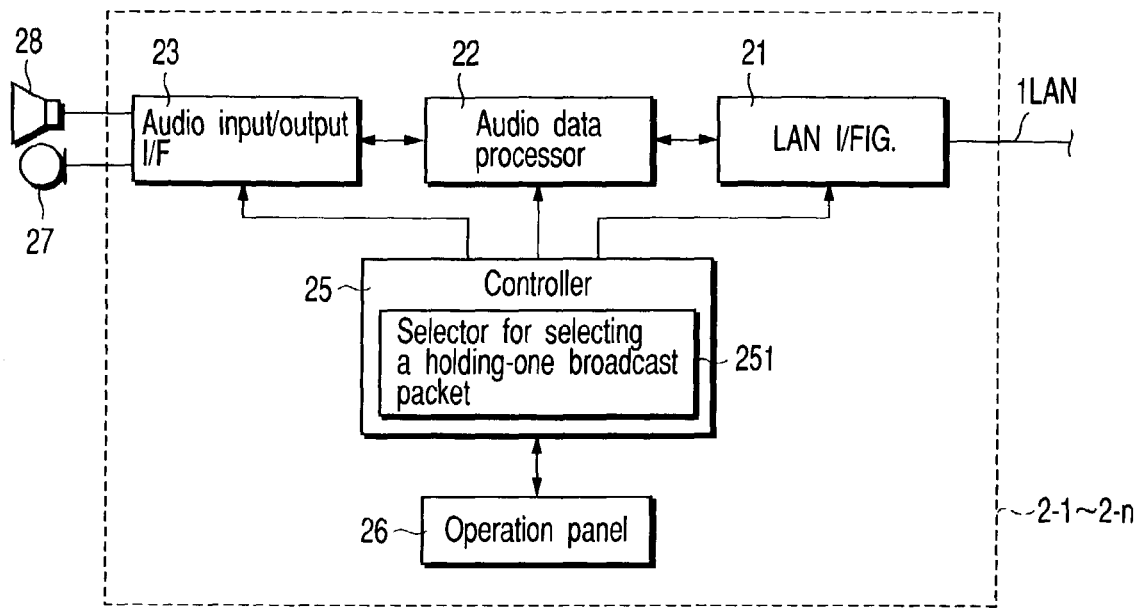
FIG. 3 a block diagram illustrating the various functions each network telephone terminal performs in the system of FIG. 1.

The network telephone terminals 2-1 to 2-n have performs various functions, which are illustrated in FIG. 3 that is a block diagram.

As FIG. 3 shows, each of the network telephone terminals 2-1 to 2-n comprises a LAN interface (I/F) 21, an audio packet processor 22, an audio input/output interface (I/F) 23, a control channel processor 24, a controller 25, and an operation panel 26.

The LAN interface 21 receives and transmits various data items from and to the LAN 1. That is, the LAN interface 21 extracts an audio packet and control data from the packets transferred from the LAN 1. The audio packet and control data are supplied to the audio data processor 22 and the control channel processor 24, respectively. The LAN interface 21 multiplexes the data items supplied from the controller 25 with the audio packet supplied from the audio packet processor 22, generating multiplex data. The multiplex data is transmitted from the LAN interface 21 to the LAN 1.

The audio packet processor 22 receives an audio packet from the LAN interface 21 and converts the audio packet into an analog received audio signal. The analog received audio signal is supplied to the audio input/output interface 23. Further, the audio packet processor 22 receives an audio signal to be transmitted, from the audio input/output interface 23, and converts this audio signal into an audio packet that can be easily transferred in the LAN 1. The audio packet is supplied to the LAN interface 21.

A microphone 23 and a speaker 28 are connected to the audio input/output interface 23. The audio input/output interface 23 receives an audio signal transmitted from the microphone 27 and supplies the same to the audio packet processor 22. The interface 23 also receives an audio signal from the audio packet processor 22, amplifies this signal, and supplies the signal to the speaker 28. The speaker 28 generates a speech from the audio signal.

The control channel processor 24 monitors the control data supplied from the LAN interface 21 and generates an interruption signal to inform the controller 25 of the receipt of the control signal.

The controller 25 comprises a CPU, a ROM and a RAM. The controller 25 executes programs (software) to control the other components of the network telephone terminal and serves to achieve the communication between the network telephone terminal and the host apparatus 3 via the LAN 1.

The operation panel 26 has an input device and a display. The input device may be a group of key switches. The display may be an LCD. The user operates the operation panel 26 to input various instructions to the controller 25. Under the control of the controller 25, various information items are given to the user.

The controller 25 comprises a packet selector 251 for selecting a holding-one broadcast packet. The packet selector 251 selects one of the holding-tone channels on the LAN 1 while the network telephone terminal remains in holding state.

It will be described how the audio packet communications system, which is configured as indicated above, performs audio communication.

First, the basic communication linking will be explained.

The network telephone terminals 2-1 to 2-n connected to the LAN 1 have an extension number each. Thus, each network telephone terminal can be identified with the extension number assigned to it. The host apparatus 3 stores the extension numbers of the network telephone terminals 2-1 to 2-n. The host apparatus 3 stores routing information, too. The routing information is used to determine which telephone terminal should receive a call from the network 4, prior to any other network telephone terminal.

Assume that the external telephone terminal 5 and the network telephone terminal 2-1 connected to the LAN 1 have the telephone number of "042-585-1234" and the extension number of "3000," respectively, as specified in FIG. 1. Also assume that the telephone number associated with the extension number "3000" and valid on the public line connected to the host apparatus 3 is "042-585-3000," as is illustrated in FIG. 1.

The user of the external telephone terminal 5 may dials "042-585-3000" to talk with any person at the network telephone terminal 2-1 that is connected to the LAN 1. In this case, the network 4 sends a receipt signal to the host apparatus 3. Upon receipt of the receipt signal, the host apparatus 3 refers to the routing information, retrieving the extension number "3000" associated with the number "042-585-3000" assigned to the terminal 2-1. The host apparatus 3 then transmits a connection-request signal to the network telephone terminal 2-1.

In response to the connection-request signal, the network telephone terminal 2-1 generates a call-receipt tone or displays the receipt of a call. Hearing the call-receipt tone or seeing the call receipt displayed, the user of the terminal 2-1 knows that his or her telephone terminal has received a call. When the user operates the network telephone terminal 2-1, thus responding to the call, the terminal 2-1 transmits a connection-response signal to the host apparatus 3 that has transmitted the connection-request signal. When the host apparatus 3 receives the connection-response signal, it transmits a response signal to the network 4. As result, a communications path is established between the external telephone terminal 5 (i.e., the calling terminal) and the network telephone terminal 2-1 (i.e., the called terminal). Audio communication can now be possible between the telephone terminals 2-1 and 5.

When the user of the external telephone terminal 5 talks into the transmitter thereof, the terminal 5 generates an audio signal. The audio signal is transmitted via the network 4 to the host apparatus 3. The host apparatus 3 receives the audio signal and converts it into an audio packet. The audio packet is forwarded via the LAN 1 to the network telephone terminal 2-1. Upon receipt of the audio packet, the network telephone terminal 2-1 extracts audio data from the audio packet. The audio data is converted into an analog audio signal, which is supplied to the speaker 28. The speaker 28 amplifies the analog audio signal and generates a speech from the analog audio signal.

The user of the network telephone terminal 2-1 may talk into the microphone 27. In this case, the microphone 27 generates an audio signal. This analog audio signal is converted into an audio packet in the channel telephone terminal 2-1. The audio packet is transmitted via the LAN 1 to the host apparatus 3. The host apparatus 3 converts the audio packet into an audio signal, which is transmitted via the network 4 to the external telephone terminal 5.

(1) Holding Process in the Intra-Extension Communication

Figure 4:
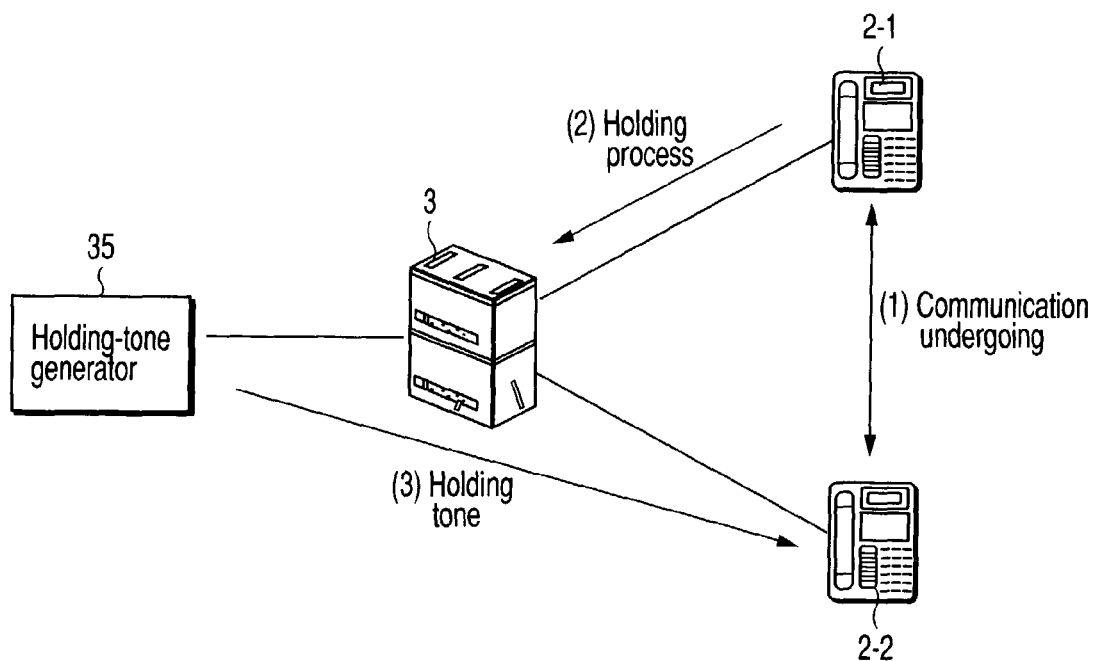
FIG. 4 is a diagram explaining how a holding process is carried out through extension lines.

Assume that intra-extension communication is carried out, between the network telephone terminals 2-1 and 2-2 as is illustrated in FIG. 4.

The user of the network telephone terminal 2-1 may operate the terminal 2-1, setting the terminal 2-1 into the holding state. If so, the network telephone terminal 2-1 transmits a holding-state signal via the LAN 1 to the host apparatus 3. When the host apparatus 3 receives the holding-state signal, it switches the communication between the network telephone terminals 2-1 and 2-2 to holding sate and transmits a holding-state signal to the network telephone terminal 2-2. When the network telephone terminal 2-2 responds to the holding-state signal, the host apparatus 3 makes the terminal 2-2 select a holding-tone packet.

As a result, the communication partner of the network telephone terminal 2-2 changes from the network telephone terminal 2-1 to the holding-tone generator 35. Thereafter, the user of the network telephone terminal 2-2 can hear a holding tone transmitted from the holding-tone generator 35. Note that the holding tone is either a continuous tone or repeated tones.

(2) Release of the Holding State

Assume that the network telephone terminal 2-2 remains connected to the holding-tone generator 35.

The user of the network telephone terminal 2-1 may operate the terminal 2-1 to release the terminal 2-1 from the holding state. In this case, the network telephone terminal 2-1 transmits a release signal via the LAN 1 to the host apparatus 3. Upon receipt of the release signal, the host apparatus 3 transmits a holding-release signal to the network telephone terminal 2-2. When the network telephone terminal 2-2 responds to the holding-release signal, the host apparatus 3 connects the terminal 2-2 to the terminal 2-1.

The communication partner of the network telephone terminal 2-2 is switched from the holding-tone generator 35 to the network telephone terminal 2-1. The user of the network telephone terminal 2-2 can then talk with the user of the network telephone terminal 2-1.

Figure 5:
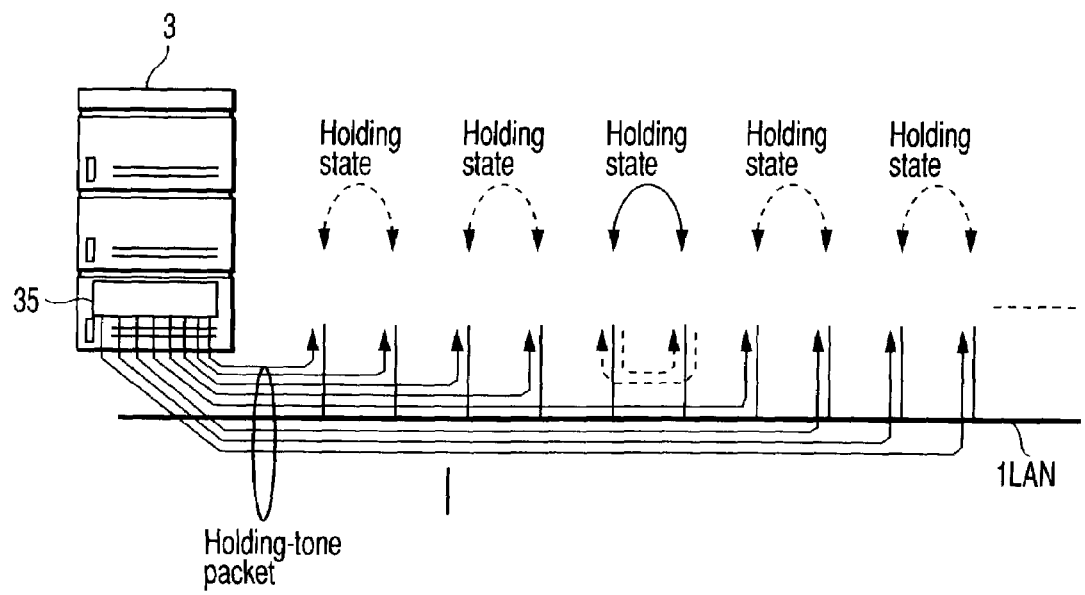
FIG. 5 is a diagram explaining how the holding-tone generator is connected to many network telephone terminals assuming holding state, in a conventional audio packet communications system.
Figure 6:
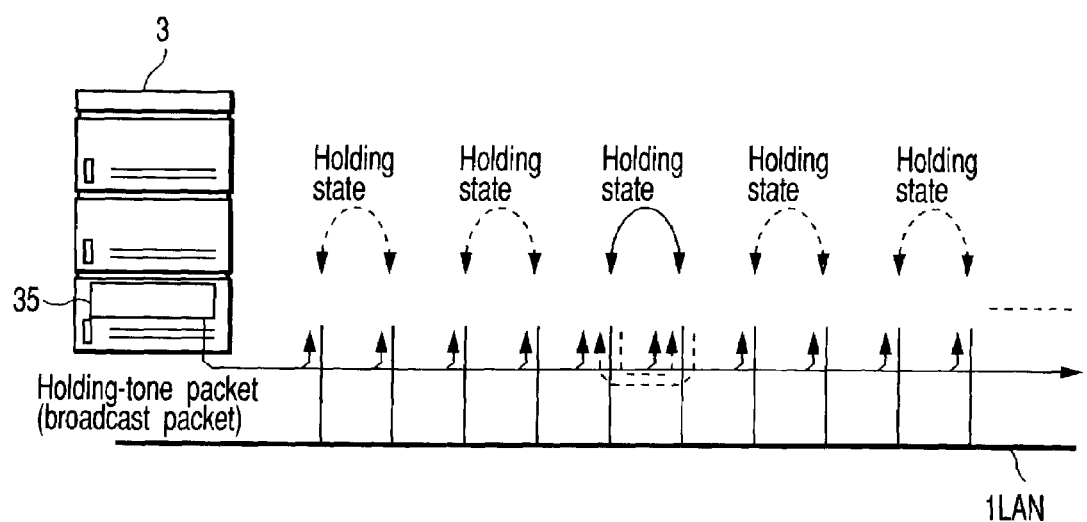
FIG. 6 is a diagram explaining how the holding-tone generator is connected to many network telephone terminals assuming holding state, in the system illustrated in FIG. 1.

The more network telephone terminals on the LAN 1 assume the holding state, the more communication packets will be used on the LAN 1 as is seen from FIG. 5. This may increase the communications traffic. In the present embodiment, the holding-tone generator 35 broadcasts a holding-tone packet to the network telephone terminals 2-1 to 2-n on the LAN 1. Therefore, the LAN 1 can be efficiently utilized, no matter how many network telephone terminals remain in the holding state.

As indicated above, the host apparatus 3 incorporates the holding-tone generator 35 in the embodiment. The holding-tone packet generated the holding-tone generator 35 is broadcast to the network telephone terminals 2-1 to 2-n. Any network telephone terminals that assume the holding state receive the same holding-tone packet.

Hence, the limited number of channels, available on the LAN 1, can be efficiently used, whereby numerous network telephone terminals 2-1 to 2-n share the same holding-tone packet. This helps to reduce the overall cost of the audio packet communications system.

In the system, the network telephone terminals 2-1 to 2-n need not one communications channel each. The working load on the connection controller 33 is therefore smaller than the case where a communication channel is provided for one network telephone terminal.

The present invention is not limited to the embodiment described above. The host apparatus 3 may generate various music packets representing BGM (Background Music) works, not a holding-tone packet as in the embodiment. If this is the case, the operator of the network telephone terminals 2-1 to 2-n may operate their terminals to transmit a music-packet request signal to the host apparatus 3 in order to get any music packets desired.

In the embodiment, the host apparatus 3 incorporates the holding-tone generator 35. Nonetheless, the holding-tone generator 35 may be provided on any terminal that is not used at all on the LAN 1. Alternatively, the holding-tone generator 35 may be incorporated into one of the network telephone terminals.

In the embodiment, any network telephone terminal may assume the holding state while communicating with another network telephone terminal. Instead, any network telephone terminal may assume the holding state while communicating with any external telephone terminal on a network that may be the public network or a dedicated network.

Moreover, the present invention can be modified in various ways, without departing from the scope and spirit of the invention. For example, the type of the network used, the configuration of the host apparatus, the structure of the network telephone terminals, the types of special audio packets, i.e., holding-tone packets and music packets, and the means for receiving the special-tone packets can be changed.

What is claimed is:

1. A network telephone terminal used in an audio packet communications system, the audio packet communications system comprising:
   a local area network having a plurality of nodes which share a transfer medium and which perform communication independently of one another;
   a plurality of network telephone terminals connected to the local area network, each configured to convert an input audio signal into an audio packet, transmit the audio packet to the local area network, convert an audio packet received from the local area network, convert the audio packet into an audio signal, and output the audio signal;
   an exchanger which connects the network telephone terminals to one another in a first state and the local area network to an external communications network in a second state, converts an audio signal received from the external communications network, into an audio packet, transmits the audio packet to the local area network, converts an audio packet received from the local area network, into an audio signal, and sends the audio signal to the external communications network; and
   a special packet transmitter which transmits, to the local area network, a special audio packet which is to be simultaneously received at the nodes of the local area network for the network telephone terminals,
   wherein each of the network telephone terminals comprises a special packet receiver which receives the special audio packet when the special audio packet is demanded at the network telephone terminal, and the terminal comprising:
   a special packet receiver which receives the special audio packet when the special audio packet is demanded,
   wherein the special packet receiver receives a holding-tone packet, in response to a holding-state signal supplied from the network telephone terminal or the exchanger which is switched from an audio communication state to a holding state.

2. A network telephone terminal according to claim 1, wherein the special packet receiver receives a music packet, in response to a request for the music packet.

3. A network telephone terminal according to claim 1, wherein the special packet receiver selects and receives one of various types of special audio packets.

4. A special packet process method used in an audio packet communications system, the audio packet communications system comprising:
   a local area network having a plurality of nodes which share a transfer medium and which perform communication independently of one another;
   a plurality of network telephone terminals connected to the local area network, each configured to convert an input audio signal into an audio packet, transmit the audio packet to the local area network, convert an audio packet received from the local area network, convert the audio packet into an audio signal, and output the audio signal;
   an exchanger which connects the network telephone terminals to one another in a first state and the local area network to an external communications network in a second state, converts an audio signal received from the external communications network, into an audio packet, transmits the audio packet to the local area network, converts an audio packet received from the local area network, into an audio signal, and sends the audio signal to the external communications network; and
   a special packet transmitter which transmits, to the local area network, a special audio packet which is to be simultaneously received at the nodes of the local area network for the network telephone terminals,
   wherein each of the network telephone terminals comprises a special packet receiver which receives the special audio packet when the special audio packet is demanded at the network telephone terminal, and the method comprising:
   transmitting, to the local area network, a special audio packet which is to be simultaneously received at the nodes of the local area network for the network telephone terminals,
   making the network telephone terminal receive the special audio packet when the special audio packet is demanded at the network telephone terminal,
   wherein the making includes receiving a holding-tone packet in response to a holding-state signal supplied from the network telephone terminal or the exchanger which is switched from an audio communication state to a holding state.

* * * * *